United States Patent
Ozawa et al.

(10) Patent No.: US 6,846,524 B2
(45) Date of Patent: Jan. 25, 2005

(54) INKJET RECORDING MEDIUM

(75) Inventors: Yuji Ozawa, Tokyo (JP); Toshikazu Teramasa, Tokyo (JP); Masashi Seki, Chiba (JP); Tadashi Saito, Chiba (JP)

(73) Assignee: Nippon Paper Industries Co., Ltd., Tokyo (JP)

( * ) Notice: Subject to any disclaimer, the term of this patent is extended or adjusted under 35 U.S.C. 154(b) by 122 days.

(21) Appl. No.: 10/105,737

(22) Filed: Mar. 25, 2002

(65) Prior Publication Data

US 2002/0176968 A1 Nov. 28, 2002

(30) Foreign Application Priority Data

Mar. 30, 2001 (JP) ........................................ 2001-099418

(51) Int. Cl.$^7$ .............................................. B41M 5/00
(52) U.S. Cl. ................ 428/32.1; 428/32.24; 428/32.34; 428/32.38
(58) Field of Search ............................ 428/32.1, 32.24, 428/32.34, 32.38

(56) References Cited

U.S. PATENT DOCUMENTS

| | | | |
|---|---|---|---|
| 4,460,637 A | 7/1984 | Miyamoto et al. | 428/212 |
| 4,740,420 A | 4/1988 | Akutsu et al. | 428/341 |
| 4,911,977 A | 3/1990 | Mouri et al. | 428/220 |
| 5,500,668 A | 3/1996 | Malhotra et al. | 347/105 |
| 5,714,235 A | 2/1998 | Takeuchi et al. | 428/195 |
| 5,718,793 A | 2/1998 | Inamoto et al. | 156/235 |
| 6,096,469 A | 8/2000 | Anderson et al. | 430/119 |
| 6,100,322 A | 8/2000 | Persson et al. | 524/418 |
| 6,139,940 A | 10/2000 | Iwamoto et al. | 428/195 |
| 6,140,412 A | 10/2000 | Saitoh et al. | 524/591 |
| 6,183,851 B1 | 2/2001 | Mishima | 428/304.4 |
| 6,214,458 B1 | 4/2001 | Kobayashi et al. | 428/332 |
| 6,242,082 B1 | 6/2001 | Mukoyoshi | 428/212 |
| 6,258,451 B1 | 7/2001 | Valentini et al. | 428/212 |
| 6,284,819 B1 | 9/2001 | Darsillo et al. | 524/22 |
| 6,326,323 B1 | 12/2001 | Shimano | 442/76 |
| 6,391,428 B1 | 5/2002 | Ueno et al. | 428/195 |
| 6,410,123 B1 | 6/2002 | Otani et al. | |

FOREIGN PATENT DOCUMENTS

| | | | |
|---|---|---|---|
| EP | 0 275 711 | 7/1988 | B41M/1/26 |
| EP | 0 339 604 A | 11/1989 | B41M/1/30 |
| EP | 391 308 | 10/1990 | B41M/1/36 |
| EP | 0 436 230 A1 | 7/1991 | B41M/5/00 |
| EP | 500 021 A1 | 8/1992 | B41M/1/30 |
| EP | 0 663 300 A1 | 7/1995 | B41M/5/00 |
| EP | 1 072 429 A | 1/2001 | B41M/5/00 |
| JP | 57-087988 | 6/1982 | B41M/5/00 |
| JP | 61-1464591 | 7/1986 | B41M/5/00 |
| JP | 63-222885 | 8/1988 | B41M/1/26 |
| JP | 3215080 | 9/1991 | B41M/1/30 |
| JP | 3256785 | 11/1991 | B32B/7/02 |
| JP | 5/051469 | 3/1993 | C08J/7/04 |
| JP | 6-092011 | 4/1994 | B41M/5/00 |
| JP | 7-032725 | 2/1995 | B41M/5/00 |
| JP | 7089220 | 4/1995 | B05D/3/12 |
| JP | 7101142 | 4/1995 | B41M/5/00 |
| JP | 7117335 | 5/1995 | B41B/5/00 |
| JP | 8246392 | 9/1996 | D21H/19/36 |
| JP | 9183265 | 7/1997 | B41C/1/00 |
| JP | 10-182962 | 7/1998 | C08L/75/04 |

OTHER PUBLICATIONS

Patent Abstracts of Japan, Takigawa Junko, Resin Composition for Printing, Oct. 31, 1998, vol. 1998, No. 12.

*Primary Examiner*—Bruce H. Hess
(74) *Attorney, Agent, or Firm*—Gary C. Cohn PLLC

(57) ABSTRACT

An inkjet recording medium comprising at least one ink receiving layer on a support, wherein the ink receiving layer which is the outermost layer comprises a pigment and an aqueous polyurethane resin as principal components, the proportion of said aqueous polyurethane resin relative to said pigment in the ink receiving layer which is the outermost layer is 5–80 wt %, said aqueous polyurethane resin is formed by reaction of an active hydrogen compound and an aliphatic and/or alicyclic polyisocyanate compound, said active hydrogen compound contains 40–80 wt % of a polyether polyol compound having a number average molecular weight of 500–3000, and the minimum film-forming temperature of said aqueous polyurethane resin is −10–50 degree C.

11 Claims, No Drawings

INKJET RECORDING MEDIUM

FIELD OF THE INVENTION

This invention relates to an inkjet recording medium having good gloss and surface strength, wherein discoloration of the recording medium and fading of the image are suppressed, and in particular relates to an inkjet recording medium suitable for a recording method using an aqueous ink.

In recent years, remarkable progress has been made in ink inkjet printers, and due to the great popularity of digital cameras, higher quality is being required of inkjet recording media every year. This is particularly true with regard to inkjet recording media having a gloss comparable to that of conventional silver salt photographs. Until now, the most important qualities were those of high gloss, ink absorption and print density, and this is still true today, but in addition to these qualities, retention properties of the blank paper part, image part and surface strength are also strongly desired.

This gloss type inkjet recording medium can be manufactured by various means making use of the characteristics of manufacturing equipment, and its manufacture by the cast coater is the most advantageous from the cost viewpoint.

In the cast coating method, a coating solution component having a pigment and a binder as principal components is coated onto a raw paper, and then cast finished. Specifically, three methods are in general use, viz., (1) the wet cast method (direct method) wherein a coating layer is pressed onto a heated drum with a mirror surface finish while it is still wet, and dried, (2-) the rewet method wherein the wet coating layer is first dried or semi-dried, swelling plasticized by rehumidification, pressed onto a heated drum with a mirror surface finish and dried, and (3) the gelation cast method wherein the wet coating layer is converted to a gel by coagulation, pressed onto a heated drum with a mirror surface finish and dried.

In these manufacturing methods, the principle of pressing the wet coating layer onto a surface with a mirror surface finish in order to confer gloss to the coating layer surface is identical, but different manufacturers have different techniques, and recording media manufactured by coagulation have a surface appearance and gloss which rivals those of silver salt photographs.

In general, from the viewpoint of the pigment used in the ink jet recording medium and ink absorption characteristics, permeable materials such as silica and alumina are suitable. On the other hand, the binder used in cast coating differs as to suitability depending on the particular manufacturing method, examples being PVA, casein, starch, SBR, acryl, styrene acryl, vinyl acetate and urethane.

In particular, SBR and acryl have excellent gloss and surface strength, and are therefore widely used in commercial inkjet recording media. In SBR, the double bond of the butadiene skeleton has the function of an antioxidant, and therefore suppresses fading of the image. However, when the double bond of the butadiene forming the SBR skeleton oxides, the inkjet recording medium itself undergoes a discoloration.

Acryl has an equivalent gloss and strength to those of SBR, and there is no discoloration of the recording medium which is a problem with SBR, but the image part tends to fade easily. Thus, the binders generally used in inkjet recording media all have advantages and disadvantages.

In the case of urethane, Japanese Patent Application Public Disclosure (Kokai) Hei 8-246392 discloses an inkjet recording cast coating paper using an aqueous urethane resin, but as the performance of the urethane is completely different depending on the combination of isocyanate and polyol, all urethane resins do not have identical properties. Consequently, in order to give the urethane used in the ink receiving layer the qualities required for the inkjet recording medium, it was necessary to select from a large number of isocyanate and polyol combinations.

SUMMARY OF THE INVENTION

As a result of studies performed on urethanes having suitable gloss, strength, no discoloration in the blank paper part and prevention of ink fading in the image part, the Inventor found that the above problems can be solved by using an aqueous polyurethane resin having a specific composition and resin properties, and this led to the present invention.

This invention is an inkjet recording medium comprising at least one ink receiving layer on a support, wherein the ink receiving layer which is the outermost layer comprises a pigment and an aqueous polyurethane resin as principal components, the proportion of said aqueous polyurethane resin relative to said pigment in the ink receiving layer which is the outermost layer is 5 80 wt %, said aqueous polyurethane resin is formed by reaction of an active hydrogen compound and an aliphatic and/or alicyclic polyisocyanate compound, said active hydrogen compound contains 40–80 wt % of a polyether polyol compound having a number average molecular weight of 500–3000, and the minimum film-forming temperature of said aqueous polyurethane resin is −10 to 50 degree C. The inkjet recording medium may also contain a binder other than said aqueous polyurethane resin, in an amount of no more than the weight of said aqueous polyurethane resin, in the ink receiving layer which is the outermost layer. It is preferred that the ink receiving layer of the outermost layer is formed by the gelation cast method, and more preferred that the gelation cast method uses a coagulating liquid containing ammonium formate.

This invention is also a coating solution for an ink receiving layer of an inkjet recording medium wherein a pigment and an aqueous polyurethane resin are dissolved or dispersed in water as principal components, wherein the proportion of said aqueous polyurethane resin relative to said pigment in the ink receiving layer which is the outermost layer is 5–80 wt %, said aqueous polyurethane resin is formed by reaction of an active hydrogen compound and an aliphatic and/or alicyclic polyisocyanate compound, said active hydrogen compound contains 40–80 wt % of a polyether polyol compound having a number average molecular weight of 500–3000, and the minimum film-forming temperature of said aqueous polyurethane resin is −10–50 degree C., said aqueous polyurethane resin has an acidic group and the acid value per resin solid content is 20–60 mg KOH/g, and the weight average particle diameter of said aqueous polyurethane resin is 80–200 nm. The coating solution may further contain a binder other than said aqueous polyurethane resin, in an amount of no more than the weight of said aqueous polyurethane resin.

DESCRIPTION OF THE PREFERRED EMBODIMENTS

In this invention, the term "aqueous" of the "aqueous polyurethane resin" means that the polyurethane resin dissolves or disperses in a medium comprising water or water and a small amount of an organic solvent, and is thereby stabilized. If an organic solvent is used, its proportion is less than 50 wt % and preferably less than 10 wt % relative to the water, and it is required that the resin solution has no flash point. To manufacture the inkjet recording medium of this invention, this aqueous polyurethane resin is dissolved or dispersed in the coating solution coated on the support, and after coating and drying, the polyurethane resin becomes a pigment binder.

The aqueous polyurethane resin used in this invention is obtained by reaction of a suitable polyisocyanate compound and active hydrogen compound.

The polyisocyanate compound may be aliphatic or alicyclic, there being no particular limitation provided that the compound is within the scope of this invention. Specific examples which can easily be obtained industrially are polyisocyanate compounds which do not show any yellowing or do not easily yellow, such as hexamethylene diisocyanate, isophorone diisocyanate, 4,4-dicyclohexyl methane-diisocyanate, norbornyl isocyanate, xylelene diisocyanate, hydrated xylene diisocyanate or m-tetramethylxylelene-diisocyanate, alkyl derivatives, alkoxy derivatives, or nitro derivatives, prepolymers, carbodiimides or biuret compounds with polybasic alcohols, and dimer/trimer reaction products. Of these, from the viewpoint of preventing discoloration of the inkjet recording medium, the non-yellowing type are to be preferred, and hexamethylene diisocyanate, isophorone diisocyanate, 4,4-dicyclohexyl methane-diisocyanate, norbornyl isocyanate, hydrated xylene diisocyanate, alkyl derivatives, alkoxy derivatives or nitro derivatives, prepolymers, carbodiimides or Biuret compounds with polybasic alcohols, and dimer/trimer reaction products, are particularly preferred.

Polyether polyol compound can be used as an active hydrogen compound which can react with the above polyisocyanate compounds.

The polyether polyol compound used in this invention may be obtained by a ring-opening polymerization or copolymerization of cyclic ether compounds. Examples are polyethylene glycol, polypropylene glycol, polybutylene glycol, polytetramethylene ether glycol, and ethylene oxide or propylene oxide derivatives of same. These compounds may be used individually, or two or more may be used in combination.

The polyether polyol compound used in this invention may be manufactured by a ring-opening polymerization or copolymerization known in the art.

Examples of initiators which can be used during the manufacture by ring-opening polymerization or copolymerization of the polyether polyols used in this invention are aliphatic polyols such as ethylene glycol, diethylene glycol, triethylene glycol, 1,4-butane diol, 1,3-butane diol, propylene glycol, dipropylene glycol, butylene glycol, neopentyl glycol, glycerine, trimethyloyl methane, trimethylol propane, butane triol, pentaerythritol, dipentaerythritol, tripentaerythritol, hexane triol, tris(2-hydroxyethyl) isocyanate, cyclopentane diol, cyclohexane diol, cyclohexane dimethanol and dicyclohexane diol; aromatic polyols such as dihydroxybenzene, bisphenol A, bisphenol F, xylene glycol, bisphenol A-bis-(2-hydroxyethyl ether) and bisphenol S; and active hydrogen compounds such as ethylene diamine, diethylene triamine, triethylene tetra-amine, propylene diamine, butylene diamine, hexamethylene diamine, cyclohexylene diamine, phenylenediamine, tolylene diamine, xylene diamine, m-xylene diamine, isophorone diamine and norbornyl diamine.

Examples of alicyclic ether compounds which can be used in the ring-opening polymerization or copolymerization of the polyether polyol compound used in this invention, are ethylene oxide, propylene oxide, trimethylene oxide, butylene oxide, alpha-methyl trimethylene oxide, 3,3'-dimethyltrimethylene oxide, tetrahydrofuran and dioxane.

In this invention, an active hydrogen compound other than the aforesaid polyether polyol compounds which can react with the polyisocyanate compound may also be used in conjunction.

Examples of such active hydrogen compounds are polyol compounds, i.e., aliphatic polyols such as ethylene glycol, diethylene glycol, triethylene glycol, 1,4-butane diol, 1,3-butane diol, propylene glycol, dipropylene glycol, butylene glycol, neopentyl glycol, glycerine, trimethyloyl ethane, trimethyloyl propane, butane triol, pentaerythritol, dipentaerythritol, tripentaerythritol, hexane triol, tris(2-hydroxyethyl) isocyanate, cyclopentane diol, cyclohexane diol, cyclohexane dimethanol and dicyclohexane diol, and aromatic polyols such as dihydroxybenzene, bisphenol A, bisphenol F, xylene glycol, bisphenol A-bis-(2-hydroxyethyl ether) and bisphenol S; polyester polyols, polycarbonate polyols, polycaprolactone polyols and silicone polyols; condensation products of an organic acid such as oxalic acid, glutamic acid, adipic acid, acetic acid, phthalic acid, isophthalic acid, salicylic acid and pyromellitic acid with the above polyols; and polyamines such as ethylene diamine, diethylene triamine, triethylene tetramine, propylene diamine, butylene diamine, hexamethylene diamine, cyclohexylene diamine, phenylenediamine, tolylene diamine, xylene diamine, m-xylene diamine, isophorone diamine and norbornyl diamine. These compounds may be used individually, or two or more may be used together.

The aqueous polyurethane resin used in this invention must contain 40–80 wt % and preferably 40–65 wt % of a polyether polyol compound having a number average molecular weight of 500–3000, and preferably 1000–2000, relative to 100 weight parts of the active hydrogen compound which can react with the aforesaid polyisocyanate compound in the molecular chain. The number average molecular weight can be found by a polystyrene standard conversion using gel permeation chromatography (GPC).

By using the above polyether polyol compound, the surface feeling and gloss of the paper obtained is better than if an identical weight of an ester polyol compound, carbonate polyol compound or caprolactone polyol compound of number average molecular weight 500–3000 were used as the active hydrogen compound.

The value of the solids acid value in the aqueous polyurethane resin used in this invention obtained by a measurement method based on JIS(Japanese Industrial Standards)K5400 is preferably 20–60 mg KOH/g and particularly preferably, 25–45 mg KOH/g. Within the above ranges of acid value, coagulation properties and gloss are satisfactory.

In this invention, the aqueous polyurethane resin contains an acidic group. This acidic group may be any group having acidic properties, those groups containing a carboxyl group or sulfonic acid group being preferred. The component which introduces the acidic group into the aqueous polyurethane resin may for example be 2,2-dimethyloyl lactic acid, 2,2-dimethyloyl propionic acid, 2,2-dimethyloyl valeric acid, 3,4-diaminobutane sulfonic acid, 3,6-diamino-2-toluene sulfonic acid or caprolactone-modified products thereof.

It is required that the minimum film-forming temperature (MFT) of the aqueous polyurethane resin used in this invention is in the range −10–50 degree C., and preferably −10–30 degree C. When the minimum film-forming temperature is higher than −10 degree C., the paper surface does not easily block, and when the minimum film-forming temperature is below 50 degree C., the strength of the paper surface tends to increase. This minimum film-forming temperature is measured based on JIS K6828.

The weight average particle diameter of the aqueous polyurethane resin used in this invention is preferably 80–200 nm, and particularly preferably 100–200 nm. If the weight average particle diameter is less than 200 nm, the coating operation is satisfactory, and if the weight average particle diameter is larger than 80 nm, ink absorption properties during printing tend to improve. The weight average particle diameter in this invention is found by a dynamic light-scattering method.

There is no particular limitation on the method of manufacturing the aqueous polyurethane resin of this invention, and the following methods may for example be used.

(1) A polyisocyanate compound, active hydrogen compound which can react with an isocyanate group, and a compound containing an active hydrogen group which can react with an isocyanate group having at least one of a carboxyl group and sulfonic acid group in the molecule, are reacted in the presence or absence of an organic solvent at an equivalence ratio such that the isocyanate group is in excess to manufacture a urethane prepolymer having isocyanate groups at the end of the molecule. Subsequently, the carboxyl group and/or sulfonic acid group in the prepolymer is neutralized by a neutralizing agent such as a tertiary amine. Next, this neutral prepolymer is reacted by introducing it into an aqueous solution containing a chain elongating agent, and any organic solvent in the system is removed to give the aqueous polyurethane resin.

(2) The urethane prepolymer which is not yet neutralized obtained by the above method is introduced into an aqueous solution containing a neutralizing agent and chain elongating agent, and reacted to obtain an aqueous prepolymer resin.

(3) An aqueous solution containing a chain elongating agent is added to the neutralized prepolymer obtained by the above method (1) and reacted to obtain an aqueous prepolymer resin.

(4) An aqueous solution containing a neutralizing agent and chain elongating agent is added to the urethane prepolymer which is not yet neutralized obtained by the above method (1), and reacted to obtain an aqueous prepolymer resin.

The chain elongating agent used in this invention may be any agent normally used in polyurethane manufacture, for example, water or a polyamine compound such as ethylene diamine, diethylene triamine, triethylene tetramine, propylene diamine, butylene diamine, hexamethylene diamine, cyclohexylene diamine, tolylene diamine, xylene diamine, isophorone diamine or norbornyl diamine is suitable.

Further, if an organic solvent is used in the manufacture of the prepolymer, this organic solvent may be a ketone such as methyl ethyl ketone or acetone, an ester such as methyl acetate or ethyl acetate, a glycol ether such as tetrahydrofuran or diethylene glycol dimethyl ether, or N-methyl-2-pyrrolidone. These solvents may be used alone, or two or more may be used as a mixture. When the above organic solvent is present in the aqueous polyurethane resin obtained, it is required that there is no flash point of the resin solution, when measured by the tag closed system, at less than 50 wt % and preferably less than 10 wt % relative to the water in the resin solution.

The prepolymer obtained by the above manufacturing method is converted to a quaternary state by the neutralizing agent. The neutralizing agent may for example be a tertiary amine such as N,N-dimethyl ethanolamine, N,N-diethyl ethanolamine, triethylamine, N-methyl morpholine or N-ethyl morpholine, an alkali metal compound such as potassium hydroxide or sodium hydroxide, an ammonium salt such as tetramethyl ammonium hydroxide or tetraethyl ammonium hydroxide, or ammonia.

The ink receiving layer of this invention comprises a pigment and a binder, but this does not exclude other components. In this invention, the aqueous polyurethane resin functions as the binder.

In this invention, it is preferred that the aforesaid aqueous polyurethane resin content in the ink receiving layer is 5 to 80 weight parts, more preferred that it is 10 to 60 weight parts and still more preferred that it is 30 to 50 weight parts relative to 100 weight parts of the pigment. When the blending proportion of aqueous polyurethane resin increases, the ink absorption properties of the recording medium tend to decline.

In this invention, to the extent that it does not interfere with the effect of this invention, in addition to the aqueous polyurethane resin in the ink receiving layer, a binder known in the art may be used. This may for example be a starch such as starch oxide, esterified starch, enzyme-denatured starch or cationic starch, a protein such as casein or soybean protein, a cellulose derivative such as carboxyl methyl cellulose or hydroxyethyl cellulose, a water-dispersable polymer compound such as acryl emulsion, vinyl acetate emulsion, acryl-vinyl acetate emulsion, vinylidene chloride emulsion, styrene butadiene latex, acrylonitrile butadiene latex, or a polyester dispersion.

In this invention, it is preferred that the aqueous polyurethane resin accounts for at least 50 wt % in the total binder contained in the ink receiving layer.

In particular, when the coagulating method known as the gelation cast coating method is used, it is preferred that casein is blended with the binder. In this invention, when casein is blended in the ink receiving layer, the coating properties of the ink receiving layer coating solution are improved, which is desirable. The blending proportion of casein is preferably 10 wt % or less in the ink receiving layer. When the blending proportion of casein increases, the retention properties of the blank paper part tend to decline.

There is no particular limitation on the support provided that it is a sheet permeable to air, and it may be transparent or non-transparent. For example, papers such as high-quality paper, printing paper stencil, drawing paper, art paper, coated paper, cast coated paper or kraft paper, or non-woven fabric, may be used as convenient for the application. Sheets having coating layers with various functions as necessary may also be used as the support. In the support of this invention, it is desirable from the viewpoint of workability that the permeability is 1000 seconds or less, and from the viewpoint of coating properties, it is desirable that the Steckigt sizing degree is 5 seconds or more.

The pigment used in the ink receiving layer of this invention may be light calcium carbonate, heavy calcium carbonate, kaolin, clay, talc, titanium dioxide, zinc oxide, zinc carbonate, satin white, magnesium carbonate, magnesium silicate, magnesium sulphate, calcium silicate, aluminum silicate, aluminum hydroxide, alumina sol, colloidal alumina, an alumina or alumina hydrate such as pseudo-boehmite, zeolite, silica, colloidal silica or plastic pigment, but from the viewpoint of ink absorption properties and ink fixing properties, alumina or synthetic silica is preferred. The effect of this invention is particularly remarkable when the pigment is synthetic silica.

In this invention, thickeners, defoaming agents, foam suppressors, pigment agents, release agents, foaming agents, pH regulating agents, surface sizing agents, colouring dyes, color pigments, fluorescent dyes, ultraviolet absorbers, oxidation inhibitors, optical stabilizing agents, antiseptics, waterproofing agents, dye fixing agents, surfactants and humidifying paper force strengthening agents, etc. can also be added to the ink acceptance layer as convenient within limits which do not impair the effectiveness of this invention.

The ink receiving layer may be applied to the support using a coating device known in the art, on machine or off machine, such as a blade coater, roll coater, air knife coater, bar coater, curtain coater, photogravure coater, gate roll coater or short dwell coater.

Gloss may be imparted by surface processing using a known method, for example, calender treatment of the ink receiving layer. Gloss can also be imparted by forming the ink receiving layer by the cast method or transfer printing method. In the cast method, the coating surface which is still wet after coating is pressed onto a heated finishing surface and then dried. In the transfer printing method, the ink receiving layer provided on a temporary support is transferred to a support, with an imprint of the temporary support surface, by an adhesive means. In the cast method, the effect of the aqueous polyurethane resin of the invention is more remarkable.

The coating amount of the ink receiving layer may be adjusted as desired within the range that the raw paper surface can be covered and sufficient ink absorption properties are obtained, but from the viewpoint of obtaining both recording density and ink absorption properties, it is preferred that this amount is 5–30 g/m$^2$ and, if productivity is also considered, more preferred that it is 10–25 g/m$^2$ on each surface. If 30 g/m$^2$ is exceeded, the peeling properties of the mirror finishing surface decline and the coating layer tends to stick to the mirror finishing surface.

When the ink receiving layer is formed by the coagulating method known as gel cast coating, the ink receiving layer is applied by the aforesaid coating devices known in the art, the ink receiving layer which is not yet dried is generated by the coagulating solution, pressed onto the heated finishing surface, and dried. The coagulating agent used in the coagulating solution may be a salt such as a calcium, zinc or magnesium salt of formic acid, acetic acid, citric acid, tartaric acid, lactic acid, hydrochloric acid or sulfuric acid. In this invention, ammonium salts are preferred and ammonium formate is particularly preferred. If an ammonium salt is used as the coagulating agent, continuous workability does not only improve but yellowing of the aqueous polyurethane resin is suppressed.

ADVANTAGES OF THE INVENTION

As the ink jet recording medium of this invention comprises an ink receiving layer containing an aqueous polyurethane resin as the outermost layer, it has the advantages of surface strength, no discoloration of the blank paper part and no fading of the image part. Further, gloss may also be imparted by forming the ink receiving layer by the cast method.

EXAMPLES

Hereafter, the recording medium of this invention will be described by specific examples, and the properties of the recording medium will be described by comparison with comparative examples, but it should be understood that the invention is not limited thereto. The words "parts" and "%" respectively represent "parts by weight" and "wt %".

Manufacture of Support 4 parts of calcium carbonate, 1 part of cationic starch, 0.3 parts of polyacrylamide and 0.5 parts of alkylketone lactate dimer were added to a pulp obtained by beating 100 parts of broadleaf tree kraft pulp (L-BKP) to a freeness of 350 mlcsf, and paper was made by the usual method using a Nagaoka paper-making machine. Pre-drying was performed, a solution comprising 5% phosphoric acid-esterified starch and 0.5% vinyl alcohol was applied by a size press to a dry weight of 3.2 g/m$^2$, and post-drying and machine calender treatment were formed to give a support of weighting 100 g/m$^2$.

Manufacture of Aqueous Polyurethane Resin (UD-1)

205.0 g of polypropylene glycol of number average molecular weight 2000, 91.8 g neopentyl glycol, 9.2 g trimethyloyl propane, 53.8 g 2,2-dimethyloyl propionic acid, 429.4 g methylethyl ketone, 85.9 g N-methyl-2-pyrrolidone and 390.2 g isophorone diisocyanate were introduced in a 3000 ml four-necked flask equipped with thermometer, nitrogen introduction tube and cooling tube, and the reaction was performed at 80 degree C. for 10 hours. When the NCO wt % in the system was 1.7%, the mixture was cooled to 60 degree C., 32.5 g triethanolamine was added, and the mixture stirred for 30 minutes. The neutralized prepolymer solution obtained was mixed with 1631.7 g of ion exchange water, and the remaining methyl ethyl ketone was distilled off under reduced pressure at 50 degree C. to obtain an aqueous polyurethane resin (UD-1) containing 30% non-volatile components, of viscosity 200 mPa·s, pH 7.9, weight average particle diameter 170 nm, minimum film-forming temperature 10 degree C. and resin solids acid value 30 KOHmg/g. Here, the weight average particle diameter was found by measuring using the dynamic scattering method particle diameter measuring device (Otsuka Electronics Co., LPA-3000) (hereafter, idem).

Manufacture of Aqueous Polyurethane Resin (UD-2)

107.4 g of polypropylene glycol of number average molecular weight 2000, 68.5 g neopentyl glycol, 6.9 g trimethyloyl propane, 121.8 g propylene oxide modified bisphenol A of number average molecular weight 356, 48.4 g 2,2-dimethyloyl propionic acid, 385.3 g ethyl acetate, 77.1 g N-methyl-2-pyrrolidone and 397.8 g 4,4'-dicyclohexylbutane-diisocyanate were introduced in a 3000 ml four-necked flask equipped with thermometer, nitrogen introduction tube and cooling tube, and the reaction was performed at 80 degree C. for 10 hours. When the NCO wt % in the system was 1.9%, the mixture was cooled to 60 degree C., 87.6 g triethanolamine was added, and the mixture stirred for 30 minutes. The neutralized prepolymer solution obtained was mixed with 1464.1 g of ion exchange water, and the remaining ethyl acetate was distilled off under reduced pressure at 50 degree C. to obtain an aqueous polyurethane resin (UD-2) containing 30% non-volatile components, of viscosity 10 mPa·s, pH 7.8, weight average particle diameter 220 nm and minimum film-forming temperature 100 degree C.

Manufacture of Aqueous Polyurethane Resin (UD-3)

205.0 g of polypropylene glycol of number average molecular weight 2000, 91.8 g neopentyl glycol, 9.2 g trimethyloyl propane, 53.8 g 2,2-dimethyloyl propionic acid, 429.4 g methylethyl ketone, 85.9 g N-methyl-2-pyrrolidone and 390.2 g isophorone diisocyanate were introduced in a 3000 ml four-necked flask equipped with thermometer, nitrogen introduction tube and cooling tube, and the reaction was performed at 80 degree C. for 10 hours.

When the NCO wt % in the system was 1.7%, the mixture was cooled to 60 degree C., 32.5 g triethanolamine was added, and the mixture stirred for 30 minutes. The neutralized prepolymer solution obtained was mixed with 1631.7 g of ion exchange water, and the remaining methyl ethyl ketone was distilled off under reduced pressure at 50 degree C. to obtain an aqueous polyurethane resin (UD-3) containing 30% non-volatile components, of viscosity 21 mPa·s, pH 7.9, weight average particle diameter 197 nm and minimum film-forming temperature 5 degree C.

Preparation of Coagulation Solution 1

An aqueous solution comprising 5% ammonium formate, 5% dye fixing agent (Showa Polymers, Polyfix FP700) and 0.5% peeling agent (Nopcoat SYC) was prepared.

Preparation of Coagulation Solution 2

An aqueous solution comprising 5% calcium formate, 5% dye fixing agent (Showa Polymers, Polyfix FP700) and 0.5% peeling agent (Nopcoat SYC) was prepared.

EXAMPLE 1

100 parts silica (Tokuyama, fine seal X37B) was dispersed in water as a pigment, and 10 parts casein, 10 parts aqueous polyurethane resin (UD-1) were added to prepare a coating liquid of 25% solid content.

After applying this coating liquid to one side of a support so that the coating amount was 18 g/m$^2$ using a comma coater and coagulating with coagulating liquid 1, it was pressed onto a mirror surface heated to 100 degree C. while the coating layer was still humid, and dried to manufacture a cast coated paper.

EXAMPLE 2

100 parts silica (Tokuyama, fine seal X37B) was dispersed in water as a pigment, and 10 parts casein, 30 parts aqueous polyurethane resin (UD-1) were added to prepare a coating liquid of 25% solid content.

After applying this coating liquid to one side of a support so that the coating amount was 18 g/m$^2$ using a comma coater and coagulating with coagulating liquid 1, it was pressed onto a mirror surface heated to 100 degree C. while the coating layer was still humid, and dried to manufacture a cast coated paper.

EXAMPLE 3

100 parts silica (Tokuyama, fine seal X37B) was dispersed in water as a pigment, and 10 parts casein, 50 parts aqueous polyurethane resin (UD-1) were added to prepare a coating liquid of 25% solid content.

After applying this coating liquid to one side of a support so that the coating amount was 18 g/m$^2$ using a comma coater and coagulating with coagulating liquid 1, it was pressed onto a mirror surface heated to 100 degree C. while the coating layer was still humid, and dried to manufacture a cast coated paper.

EXAMPLE 4

100 parts silica (Tokuyama, fine seal X37B) was dispersed in water as a pigment, and 10 parts casein, 60 parts aqueous polyurethane resin (UD-1) were added to prepare a coating liquid of 25% solid content.

After applying this coating liquid to one side of a support so that the coating amount was 18 g/m$^2$ using a comma coater and coagulating with coagulating liquid 1, it was pressed onto a mirror surface heated to 100 degree C. while the coating layer was still humid, and dried to manufacture a cast coated paper.

EXAMPLE 5

100 parts silica (Tokuyama, fine seal X37B) was dispersed in water as a pigment, and 10 parts casein, 30 parts aqueous polyurethane resin (UD-1) were added to prepare a coating liquid of 25% solid content.

After applying this coating liquid to one side of a support so that the coating amount was 18 g/m$^2$ using a comma coater and coagulating with coagulating liquid 2, it was pressed onto a mirror surface heated to 100 degree C. while the coating layer was still humid, and dried to manufacture a cast coated paper.

Comparative Example 1

100 parts silica (Tokuyama, fine seal X37B) was dispersed in water as a pigment, and 10 parts casein, 5 parts aqueous polyurethane resin (UD-1) were added to prepare a coating liquid of 25% solid content.

After applying this coating liquid to one side of a support so that the coating amount was 18 g/m$^2$ using a comma coater and coagulating with coagulating liquid 1, it was pressed onto a mirror surface heated to 100 degree C. while the coating layer was still humid, and dried to manufacture a cast coated paper.

Comparative Example 2

100 parts silica (Tokuyama, fine seal X37B) was dispersed in water as a pigment, and 10 parts casein, 30 parts aqueous polyurethane resin (UD-2) were added to prepare a coating liquid of 25% solid content.

After applying this coating liquid to one side of a support so that the coating amount was 18 g/m$^2$ using a comma coater and coagulating with coagulating liquid 1, it was pressed onto a mirror surface heated to 100 degree C. while the coating layer was still humid, and dried to manufacture a cast coated paper.

Comparative Example 3

100 parts silica (Tokuyama, fine seal X37B) was dispersed in water as a pigment, and 10 parts casein, 30 parts aqueous polyurethane resin (UD-3) were added to prepare a coating liquid of 25% solid content.

After applying this coating liquid to one side of a support so that the coating amount was 18 g/m$^2$ using a comma coater and coagulating with coagulating liquid 1, it was pressed onto a mirror surface heated to 100 degree C. while the coating layer was still humid, and dried to manufacture a cast coated paper.

Comparative Example 4

100 parts silica (Tokuyama, fine seal X37B) was dispersed in water as a pigment, and 10 parts casein, 30 parts SBR (Sumitomo A&L, SN335R) were added to prepare a coating liquid of 25% solid content.

After applying this coating liquid to one side of a support so that the coating amount was 18 g/m$^2$ using a comma coater and coagulating with coagulating liquid 1, it was pressed onto a mirror surface heated to 100 degree C. while the coating layer was still humid, and dried to manufacture a cast coated paper.

Comparative Example 5

100 parts silica (Tokuyama, fine seal X37B) was dispersed in water as a pigment, and 10 parts casein, 30 parts acryl (Clariant Polymer, Movinyl 747) were added to prepare a coating liquid of 25% solid content.

After applying this coating liquid to one side of a support so that the coating amount was 18 g/m² using a comma coater and coagulating with coagulating liquid 1, it was pressed onto a mirror surface heated to 100 degree C. while the coating layer was still humid, and dried to manufacture a cast coated paper.

The gloss, image part retention, blank paper part retention and surface strength of the coating layer in Examples 1–5 and Comparative Examples 1–5 were evaluated according to the following evaluation criteria, and the results are shown in Table 1. If the result is not "X", the product can be used without problem. The recording was performed using an inkjet printer (PM-800C, Seiko Epson Inc.).

1. Gloss: Measurements were made based on JIS P8142. It is preferred for gloss paper to have as much gloss as possible.

2. Image part retention (1): After exposure for 3 hours in an ozone concentration of 50 ppm at 20 degree C., the concentration residual factor of the header part (cyan and magenta) was found from the following equation:

concentration residual factor (%)=Macbeth density after processing/Macbeth density before processing×100% cyan
  80% or higher: ○
  less than 80%: x
magenta
  60% or higher: ○
  less than 60%: x 3. Image part retention (2): Image part retention (1): After exposure for 24 hours to ultraviolet radiation (Xenon lamp, 70 W/m²), the concentration residual factor of the header part (cyan and magenta) was found from the following equation:

concentration residual factor (%)=Macbeth density after processing/Macbeth density before processing×100% cyan
  95% or higher: ◎
  90 to 95%: ○
  less than 90%: x
magenta
  65% or higher: ◎
  60 to 65%: ○
  less than 60%: x 4. Blank paper part retention: The color change of the blank paper part ($\Delta E^*$) was measured by leaving the paper for 4 weeks on an ordinary office wall without direct exposure to sunlight.

Less than 1.8: ◎
  1.8 to 2.0: ○
  2.0 or higher: x

5. Pencil hardness: A pencil writing test and evaluation were performed based on JIS K5400.

3H or higher: ◎
  2H-HB: ○
  B or less: x

6. Surface feeling: Defects (pinholes, gloss unevenness) in the recording medium surface were visually evaluated based on the following criteria:

○: Almost no defects, or defect level does not present a problem.
  x : Defects could clearly be observed.

7. Ink absorption properties (bleeding)

Smudging was visually evaluated at the boundary between header parts of different colours.
  ○: Color boundaries were clearly distinct
  Δ: Slight smudging at color boundary
  x : Considerable smudging at color boundary

TABLE 1

| | composition (parts by weight) | | | | | | | | Image part retention (1) | | Image part retention (2) | | Blank paper part |
| | | | | | | Pencil | | | | | | |
| | pigment | casein | aqueous polyurethane resin | coagulating agent | Surface feeling | Gloss % | hardness | Ink absorption | cyan % | magenta % | cyan % | magenta % | retension $\Delta E^*$ |
|---|---|---|---|---|---|---|---|---|---|---|---|---|---|
| Example 1 | 100 | 10 | 10 | ammonium formate | ○ | 84 | 2H (○) | ○ | 82 (○) | 62 (○) | 94 (○) | 65 (◎) | 1.7 (◎) |
| Example 2 | 100 | 10 | 30 | ammonium formate | ○ | 88 | 3H (◎) | ○ | 82 (○) | 63 (○) | 96 (◎) | 67 (◎) | 1.5 (◎) |
| Example 3 | 100 | 10 | 50 | ammonium formate | ○ | 90 | 5H (◎) | ○ | 84 (○) | 63 (○) | 95 (◎) | 68 (◎) | 1.6 (◎) |
| Example 4 | 100 | 10 | 60 | ammonium formate | ○ | 92 | 6H (◎) | Δ | 84 (○) | 62 (○) | 95 (◎) | 66 (◎) | 1.4 (◎) |
| Example 5 | 100 | 10 | 30 | calcium formate | ○ | 84 | 3H (◎) | ○ | 81 (○) | 64 (○) | 96 (◎) | 66 (◎) | 1.9 (○) |
| Comparative Example 1 | 100 | 10 | 5 | ammonium formate | ○ | 76 | 2B (x) | ○ | 80 (○) | 60 (○) | 90 (○) | 63 (○) | 1.8 (○) |
| Comparative Example 2 | 100 | 10 | 30 | ammonium formate | ○ | 76 | 3B (x) | ○ | 72 (x) | 52 (x) | 86 (x) | 48 (x) | 1.5 (◎) |
| Comparative Example 3 | 100 | 10 | 30 | ammonium formate | x | 79 | 2H (○) | ○ | 84 (○) | 69 (○) | 94 (○) | 65 (◎) | 1.7 (◎) |
| Comparative Example 4 | 100 | 10 | 30 | ammonium formate | ○ | 85 | 3H (◎) | ○ | 79 (x) | 66 (○) | 86 (x) | 53 (x) | 5.3 (x) |
| Comparative Example 5 | 100 | 10 | 30 | ammonium formate | ○ | 84 | 3H (◎) | ○ | 70 (x) | 35 (x) | 83 (x) | 61 (○) | 1.4 (◎) |

What is claimed is:

1. An inkjet recording medium comprising at least one ink receiving layer on a support, wherein the ink receiving layer which is the outermost layer comprises a pigment and an aqueous polyurethane resin as principal components, the proportion of said aqueous polyurethane resin relative to said pigment in the ink receiving layer which is the outermost layer is 5–80 wt %, said aqueous polyurethane resin is formed by reaction of an active hydrogen compound and an aliphatic and/or alicyclic polyisocyanate compound, said active hydrogen compound contains 40–80 wt % of a polyether polyol compound having a number average molecular weight of 500–3000, and the minimum film-forming temperature of said aqueous polyurethane resin is minus 10–50 degree C.

2. The inkjet recording medium as defined in claim 1, further comprising a binder other than said aqueous polyurethane resin, in an amount of no more than the weight of said aqueous polyurethane resin, in the ink receiving layer which is the outermost layer.

3. The inkjet recording medium as defined in claim 2, wherein said aqueous polyurethane resin has an acidic group and the acid value per resin solid content is 20-60 mg KOH/g.

4. The inkjet recording medium as defined in claim 3, wherein said ink receiving layer of the outermost layer is formed by the gelation cast method.

5. The inkjet recording medium as defined in claim 2, wherein said ink receiving layer of the outermost layer is formed by the gelation cast method.

6. The inkjet recording medium as defined in claim 1, wherein said aqueous polyurethane resin has an acidic group and the acid value per resin solid content is 20–60 mg KOH/g.

7. The inkjet recording medium as defined in claim 6, wherein said ink receiving layer of the outermost layer is formed by the gelation cast method.

8. The inkjet recording medium as defined in claim 1, wherein said ink receiving layer of the outermost layer is formed by the gelation cast method.

9. The inkjet recording medium as defined in claim 8, wherein said gelation cast method uses a coagulating liquid containing ammonium formate.

10. The inkjet recording medium of claim 1, wherein the the proportion of said aqueous polyurethane resin relative to said pigment in the ink receiving layer which is the outermost layer is 10–60 wt %.

11. The inkjet recording medium of claim 1, wherein the the proportion of said aqueous polyurethane resin relative to said pigment in the ink receiving layer which is the outermost layer is 30–50 wt %.

* * * * *